United States Patent [19]

Mouton et al.

[11] Patent Number: 4,998,844

[45] Date of Patent: * Mar. 12, 1991

[54] WAVE ACTUATED COASTAL EROSION REVERSAL SYSTEM FOR SHORELINES

[75] Inventors: William J. Mouton, New Orleans; Robert Grush, Metairie; Dolores B. Alton, New Orleans, all of La.

[73] Assignee: Charles C. Garvey, Jr., River Ridge, La. ; a part interest

[*] Notice: The portion of the term of this patent subsequent to Oct. 30, 2007 has been disclaimed.

[21] Appl. No.: 472,624

[22] Filed: Jan. 30, 1990

Related U.S. Application Data

[63] Continuation of Ser. No. 300,793, Jan. 23, 1989, Pat. No. 4,896,996.

[51] Int. Cl.$^5$ .............................................. F02B 3/06
[52] U.S. Cl. ...................................... 405/21; 405/15; 405/30
[58] Field of Search ............................ 405/15–35, 405/284, 285, 286, 287; 404/37–41; 52/590, 603, 582; 446/85

[56] References Cited

U.S. PATENT DOCUMENTS

| 30,625 | 10/1884 | Hayden . |
| 242,689 | 6/1881 | Pelletier . |
| 314,022 | 3/1885 | Heard . |
| 514,815 | 6/1895 | Lee . |
| 554,354 | 2/1896 | Villa . |
| 572,762 | 12/1896 | Landers . |
| 763,171 | 6/1904 | Fichefet . |
| 984,121 | 2/1911 | Condie . |
| 994,999 | 6/1911 | Have . |
| 1,039,579 | 9/1912 | Neames . |
| 1,162,499 | 11/1915 | Maccaferri . |
| 1,164,707 | 12/1915 | Edinger . |
| 1,164,708 | 12/1915 | Edinger . |
| 1,264,708 | 12/1915 | Edinger . |
| 1,359,475 | 11/1920 | Willard . |
| 1,379,440 | 5/1921 | Brainerd . |
| 1,597,114 | 8/1926 | Scott . |
| 1,636,114 | 7/1927 | Streator . |
| 1,691,848 | 11/1928 | Johnson . |
| 1,772,821 | 8/1930 | Weber . |
| 1,822,602 | 9/1931 | Ross . |
| 1,834,060 | 12/1931 | Hough . |
| 1,847,852 | 3/1932 | Upson . |
| 1,927,834 | 9/1933 | Hughes . |
| 1,939,417 | 12/1933 | Schulz . |
| 1,987,150 | 1/1935 | Mason . |
| 1,991,196 | 2/1935 | Deer . |
| 1,993,217 | 3/1935 | Mason . |
| 2,008,866 | 7/1935 | Hoffard . |
| 2,047,197 | 7/1936 | Fordyce . |
| 2,143,461 | 1/1939 | Waring . |

(List continued on next page.)

FOREIGN PATENT DOCUMENTS

| 841292 | 5/1972 | Canada .............................. 405/19 |
| 2324214 | 11/1974 | Fed. Rep. of Germany ........ 405/33 |

*Primary Examiner*—Dennis L. Taylor
*Attorney, Agent, or Firm*—Pravel, Gambrell, Hewitt, Kimball & Krieger

[57] ABSTRACT

The critical loss of thousands of acres of shoreline, beaches, and wetlands each year is due to the simple loss of one grain of soil, silt, or sand, one grain at a time. The use of very thin precast concrete truncated conical sections, or "beach-cones" installed with interlocking leak-resistant interstitial "wave-blocks" in a simple geometric pattern, "reverse" the daily cycle of build-up and erosion by accelerating the "build-up" and preventing the recurring "wash-out" of sandy material picked up and carried out by retreating waves. The beach-cone geometry smoothly absorbs the energy of the sand-carried waves, dispersing the energy of the wave and retaining the material deposited into the center of the "beach-cones". This process begins at the next "high-tide" after installation. The critical erosional effect of wave "undertow" is eliminated. In addition, the blockage effect of a row of beach cones builds up a new "beach" on the shore-side of the installation when the "cones" are installed at the water's edge at low tide.

16 Claims, 4 Drawing Sheets

U.S. PATENT DOCUMENTS

| | | |
|---|---|---|
| 2,159,685 | 5/1939 | Buzzell . |
| 2,221,416 | 11/1940 | Tau . |
| 2,295,422 | 9/1942 | Neely et al. . |
| 2,454,292 | 11/1948 | Picket . |
| 2,577,170 | 12/1951 | Walters . |
| 2,653,450 | 9/1953 | Fort . |
| 2,662,343 | 12/1953 | Rice . |
| 2,674,856 | 4/1954 | Louckes . |
| 2,876,628 | 3/1959 | Dixon . |
| 2,892,340 | 6/1959 | Fort . |
| 3,096,621 | 7/1963 | Danel . |
| 3,176,468 | 4/1965 | Nagai et al. . |
| 3,210,944 | 10/1965 | Svec ................................. 405/33 |
| 3,301,148 | 1/1967 | Schraudenback . |
| 3,343,468 | 9/1967 | Schraudenback . |
| 3,344,609 | 10/1967 | Greiser . |
| 3,386,252 | 6/1968 | Nelson . |
| 3,421,417 | 1/1969 | Pilaar . |
| 3,597,928 | 8/1971 | Pilaar . |
| 3,903,702 | 9/1975 | Appleton . |
| 3,922,865 | 12/1975 | Nijdam . |
| 3,990,247 | 11/1976 | Palmer ................................. 405/16 |
| 4,083,190 | 4/1978 | Pey . |
| 4,152,875 | 5/1979 | Soland . |
| 4,225,269 | 9/1980 | Matsui . |
| 4,227,829 | 10/1980 | Landry . |
| 4,229,123 | 10/1980 | Heinzmann ..................... 405/286 X |
| 4,318,642 | 3/1982 | Barnet ............................... 405/15 X |
| 4,372,705 | 2/1983 | Atkinson . |
| 4,431,337 | 2/1984 | Iwasa ................................. 405/30 |
| 4,481,155 | 11/1984 | Frohwerk . |
| 4,658,541 | 4/1987 | Haile ............................... 405/284 X |

WAVE ACTUATED COASTAL EROSION REVERSAL SYSTEM FOR SHORELINES

This is a continuation division of copending application Ser. No. 07/300,793, filed 1/23/89.

BACKGROUND OF THE INVENTION

1. Field of the Invention

The present invention relates to devices for controlling coastal erosion and more particularly relates to an improved matrix of truncated cone-like hollowed elements and connecting wave blocks which control wave action and simultaneously build up accretions by collecting solid material within the matrix and adjacent thereto.

2. General Background

Erosion, unlike the effects of hurricanes, is the simple loss of one grain of sand, one grain at a time.

Beaches, the most common shoreforms in the United States, are gentle slopes covered with loose sediment. The sediment particles ranging from fine silt to coarse gravel or cobbles in size, are moved by wind and water.

In calm weather, waves at the beach are usually low, long swells. These waves have less energy than choppy storm waves and do not cause as much turbulence when they break. Swells break and run up over the foreshore of the beach until they use up their energy. Then they drop back under the force of gravity They tend to deposit material on the beach up to the normal high water line. At the high water line, a low ridge or "berm" may be formed by this type of wave action. During storms, water overtops the berm crest and washes over the backshore. The backshore area can be bordered on the inland side by dunes or the like, which are formed by the wind blowing sand and soil along the beach until it meets an obstruction.

The parts of the shore that extend into the water are more vigorously attacked than the shoreline of inlets or bays. Incoming waves tend to bend around these peninsulas, headlands, extended beaches, or seawalls, and concentrate their energy on the front and sides of the area. Extra protection or reinforcement is often needed on these exposed parts of the coast. In some coastal regions of the United States, disappearance of coastal wetlands is occurring at an alarming rate due to wave and wind action, saltwater intrusion, and settlement.

Wave motion, particularly that of breaking waves, is the most important active agent in the building and erosion of the shoreline. The characteristics of waves depend on the speed of the wind, its duration, and the unobstructed water distance, or "fetch," it blows over. As the waves break, run up the shore, and return they carry sedimentary material onshore and offshore. This sedimentary material is called littoral drift. Most waves arrive at an angle to the shore and set up a longshore current, moving littoral drift in a series of zigzags as successive wave fronts advance and retreat. The predominant direction of longshore transport is referred to as "downdrift"; the opposite direction is "updrift."

The ability of water to move material depends on its speed. Large waves or fast-moving currents can carry larger quantities and heavier littoral drift. Material picked up from inland heights, from river beds and banks, and from shoreline areas is deposited wherever the water is slowed down, and it may be picked up again when the velocity of water increases. Growing shores can be fed, or "nourished," by material that has been eroded from somewhere else. Often attempts to reduce erosion and build up one area will result in reduced deposition elsewhere, "starving" another shoreline. Erosion and accretion are two faces of the same process, which may either occur at extremely slow rates or make dramatic changes in the shoreline within a human lifetime.

Water level also influences the erosion process. Changes in high and low water levels due to seasons, tides, storms, droughts, or floods can expose new surfaces to erosion.

Seasons and storms, which affect the movement and level of water and the strength and direction of wind, alter patterns of erosion and deposition. Storms whip the water into waves higher than normal, resulting in rapid erosion of vulnerable areas and propelling stones or other debris onto shore with unusual force. As seasons turn, wind strength and direction also change, altering the path of waves and currents and resulting in new areas of erosion or accretion. Where ice forms, it reduces wave action, which may slow erosion, and at the same time it exerts tremendous horizontal and vertical forces that may weaken structures on the shore. Winter freeze and spring thaw affect rivers, streams, and lakes, changing their water levels and the speed of currents.

Although erosion can be caused by natural shoreline processes, its rate and severity can be intensified by human activity. The shoreline and the water are highly valued for recreational activities, but such may accelerate erosion. Those who build "permanent" homes and recreation facilities often ignore the fact that the shoreline is being constantly built up and worn away again. They may also fail to take into account the periodic and unpredictable effects of storms. Dredging for marinas and bulldozing of dunes for improved seascape views remove natural protection against wind and waves. Pedestrian and vehicular traffic also contribute to the destruction of shoreline defenses by destroying vegetation, degrading dunes, and weakening bluffs and banks. Docks, jetties, and other structures interrupt the natural shoreline movement of water and redirect erosive forces in unexpected and possibly undesirable directions. Saltwater intrusion into freshwater marshes can result when man digs navigation canals in the freshwater marsh. These canals become "speedways" for saltwater moving with the tides. The salt kills protective vegetation and erosion can be exponential as is presently occurring in Louisiana which has about forty percent (40%) of the nations's valueable wetlands, but the acreage is disappearing at a rate of hundred of acres per day. The loss of these wetlands is a well documented national problem that has long plagued the art.

The erosion problem is compounded by the removal of forests, overgrazing of land, burning, construction of highways and the like, and the channelization of streams.

Planting rapidly growing vegetation on areas which have been stripped is sometimes successful but usually only where the vegetation grows rapidly and extensively enough so that the soil is protected. In areas where water is continually flowing such as on riverbanks, the growth of vegetation can usually not be done quickly enough to prevent erosion. Various systems of revetment have been used to augment or replace vegetation as an erosion barrier. The art has use loose fill barriers (riprap), continuous paving mats (some with weep holes to relieve pore pressure) and porous paving mats to control erosion.

"Riprap" which is known for control of erosion is basically a barrier or coverage comprising a plurality of large chunks of concrete (obtained, for example, in salvage operations) which are dumped in a particular area. The concrete chunks are usually of random size, with some so large as to not provide protection and washouts occur underneath. Further, the placement is often random, not adequately covering the subject area.

Solid continuous paving mats of concrete are highly costly because of the extensive amount of concrete required, the difficulty and costs of installation, and the problems of hydrostatic pore pressure which are created once the concrete is in place.

Paving blocks of concrete mats and other materials are known. Flexible porous concrete mats have been used as an erosion controlling protective surface.

Different patents directed to using revetment blocks and structures for preventing soil erosion have been issued. U.S. Pat Nos. 242,689; 306,251; 314,022; 541,815; 572,762; 984,121; 994,999; 1,039,579; 1,162,499; 1,379,440; 1,597,114; 1,636,114; 1,691,848; 1,772,821; 1,822,602; 1,834,060; 1,847,852; 1,927,834; 1,939,417; 1,991,196; 1,993,217; 2,008,866; 2,047,197; 2,143,461; 2,159,685; 2,221,416; 2,295,422; 2,454,292; 2,577,170; 2,662,343; 2,674,856; 2,876,628; 3,096,621; 3,176,468; 3,210,944; 3,301,148; 3,343,468; 3,344,609; 3,386,252; 3,421,417; 3,597,928; and 4,227,828 disclose blocks and erosion control systems.

U.S. Pat. No. 4,227,820 discloses a device comprising a matrix of cellular concrete blocks, each of which has internal passageways for cables to pass therethrough and interconnect a matrix of concrete blocks. The free ends of the cables are anchored into the ground after which operation the soil is spread over the blocks to reinforce surface thus controlling soil erosion.

U.S. Pat. No. 4,152,875 discloses a ground covering with adjoining plates which are clamped together by tensioning elements extending through the plates and parallel to them.

Nijdorn in U.S. Pat. No. 3,922,865 describes a mattress having a filter cloth with metal bars woven thereinto. Spaced concrete blocks are connected to these bars.

Appelton in U.S. Pat. No. 3,903,702 describes the use of a revetment structure with similar interfitting units which form a flexible mattress. The units are provided with a series of interconnected ribs which make opposite sides of the units reflections of each other.

U.S. Pat. No. 3,597,928 discloses the use of porous flexible supporting sheets with mat of blocks which are placed on these sheets. Each mat consists of a plurality of blocks with drainage passageways therethrough and the blocks are secured to the sheets by adhesive means.

Nelson in U.S. Pat. No. 3,386,252 discloses a riprap structure for waterways, comprising rectangular blocks interconnected by a rod which extends through the blocks to provide for hooking the blocks at diagonally opposite corner ends and forming a matrix.

Dixon, U.S. Pat. No. 2,876,628 discloses a rapidly sinking articulated revetment for riverbanks comprising rigid blocks interconnected by flexible cables. The upper surface of each block has recesses from which openings extend through the whole block to provide for water passageways.

Louckes in U.S. Pat. No. 2,674,856 teaches the use of a similar flexible revetment mat which flexibility comes from the use of reinforced wires extending continuously from ne concrete block to another to form a mattress for protection of river banks from erosion.

U.S. Pat. No. 2,159,685 describes a concrete riprap consisting of precast units connected by interlocking bars which pass though the orifices in the body of each unit.

A revetment in U.S. Pat. No. 2,008,866 comprises a number of rectangular concrete blocks arranged diagonally and hooked together by crossed rods to form a mat.

U.S. Pat. No. 1,987,150 teaches the use of a revetment containing filled asphalt in a certain proportion. A mat of such asphalt is placed adjacent to a mattress consisting of slabs interlocked by cables or clips passed through the rings at each corner of slab.

U.S. Pat. No. 1,359,475 describes a seawall construction comprising concrete panels with mating tongues and grooves at their edges and locked together by metal rods passing through the notches in the tongues and grooves.

Edinger's U.S. Pat. No. 1,164,708 discloses an embankment protection construction composed of interlocking rectangular concrete slabs with integrally made hook flanges and interengaging keys and sockets for locking the slabs in a mattress.

Edinger's U.S. Pat. No. 1,164,707 discloses a flexible concrete slab revetment construction composed of concrete slabs with integrally formed concrete joints interlocking the slabs, these slabs being preferably of a triangular contour.

U.S. Pat. No. 763,171 teaches the use of embankment linings consisting of brick or stone blocks interlocked by wires passing through the perforations in block bodies.

Villa in U.S. Pat. No. 554,354 discloses a covering for protecting banks from erosion, this covering comprising cement or terra-cotta prismatie plates interconnected by wires which pass through the plates to form rows of units adapted to cover riverbeds and banks, and free ends of wires are fastened to trees or piles driven into the bank.

Flexible mats, though generally more expensive than riprap or continuous paving barriers, are usually more stable. Flexible mats are not as prone to under-cutting erosion, by water, and provide greater relief for hydrostatic pressure. Flexible mats do exhibit failure, however, when individual elements of the mat are displaced by hydrostatic pressure or wave action, for example.

In Barnett, U.S. Pat. No. 4,318,642, a method of making retaining walls utilizes stacked cylindrical and truncated conical concrete elements to be filled with soil or crushed rock. This method of stacking the conical elements leaves large gaps between the elements which must be "spanned" between by the 45 degree angle of repose of the crushed rock, or, by crushed rock larger than the annular gaps between stacked rings as shown in FIG. 20 and described as item "35". Any gap in any retaining wall subject to wave action will cause "leaching-out" of the material, day by day, by the incessant pounding of the waves.

In Fort, U.S. Pat. No. 2,653,450, a similar retaining wall structure of longer cylindrical elements which are heavier and more stable than the Barnett Patent is shown. The sheer weight of this wall requires a separate cast-in-place foundation which was not indicated in the Barnett Patent. In most cases of mud-slides and lost embankments due to poor soil, a very serious settlement and lateral movement of such a heavily constructed wall.

In Fort, U.S. Pat. No. 2,892,340, a disclosure to provide better interlocking of the previous patent is shown. The weight of the units appears significant.

In Schlueter, U.S. Pat. No. 1,893,303, a massive sea wall is described with man-sized elements which are apparently installed on a rock bottom by virtue of the pins "29" shown to anchor the interlocking hollow cylindrical tubular constructions to the sea-floor. The stability of the structure would be questionable on any seabed other than rock or coral, which, of course, do not have erosion problems.

In Pey, U.S. Pat. No. 4,083,190, a "breakwater" is constructed by stacked triangular elements. These units, if wide in horizontal dimension and shallow in vertical dimension may serve as substantial "breakwater" diffusers installed some distance from the shoreline. However the downward, vertical scouring action imposed by the vertical planes of these units would eventually cause severe tilting of the breakwater wall until it was toppled by strong seas. In any kind of vertical bulkhead or breakwater, the water is forced both upward and downward when the force of the wave contacts the wall. The downward force causes eddy currents which will undermine any vertical sea-wall with a shallow, articulated footing.

In Matsui, U.S. Pat. No. 4,225,269, similar structural foundation problems are obvious. This wall will eventually tilt backward against the wave or against the earth it is intended to restrain. The calculations of this effect is well known in Civil Engineering Practice. It may be obvious that the proposed design would be far more stable if utilized in the form shown, but inverted. The need for the "props" 32 illustrate this problem with the top-heavy inverted cones.

In Frohwerk, U.S. Pat. No. 4,481,155, a series of egg-crate tile boxes are stacked for cooling tower purposes.

In Atkinson, U.S. Pat. No. 4,372,705, an articulated concrete mat of interlocking concrete elements are intended to stabilize a sea bottom or beach. The geometry allows for vertical differential settlement or placement on an uneven bottom. The number of units to effect a solution is substantial and therefore must be installed as a very wide mat for good effect.

SUMMARY OF THE PRESENT INVENTION

It is an object of the present invention to provide stabilization of existing shorelines, beaches, marshes and river edges with an economical solution that will reverse the effects of erosion and provide a build-up of land that previously existed, or a build-up of new land on existing beaches that experience minor or major wave action.

The invention described provides a choice of elements that differ substantially from the aesthetics of large chunks of concrete or "rip-rap" commonly used today in areas of high coastal erosion. The use of concrete "rip-rap" jettys extending perpendicularly from our beaches have caused serious problems in many installations. The development of this invention was due to the erosion of a neighbor's beach "downwind" from the installation of a rip-rap "jetty".

The potential of removing the elements or re-installing them further and deeper into the water is possible, by hand, and without major lifting machinery. A minimum size "beach-cone" can be for example forty (40) inches in diameter and of one inch in thickness, weighing about 85 pounds, and can be easily carried by two persons.

Not only do the beach cones "fill-in" with sedimentary material within an inch from their top edges, there is a significant build-up of land between the shore and the installation, as well as a significant build up of new material on the seaward side of the beach-cone installation.

One aspect of the present invention is the installation of a single height of beachcones in only a double row. This installation will cause a four to five inch build-up of sedimentary material with the use of six-inch high truncated cones when installed at the low-tide water edge of a shallow beach.

In a further aspect of the invention, two rows of circular truncated beachcones are installed in an orthogonal pattern, with a single row installed above the lower pattern in a line parallel to the beach. This "two-high" system doubles the height of the erosion-reversal system.

In a still further aspect of the invention, three rows may be installed at the beach level, with two rows on the second level, and a single row at the third level, tripling the height of the installation.

It is therefore possible to build up a pyramid of beach cones as high as may be desired, such as 5 rows, 4,3,2 and a single row on top making a five-high pyramid some thirty (30) inches tall when constructed of six-inch high beach cones. The spreading of the foundation load is considerable in a five high installation, 2½ feet in height and 17½ feet in width. Most of the weight will be the beach material itself due to the 1 inch "thinness" of the structure.

Although the preferred embodiment consists of circular, truncated concrete cones, it should be understood that square, hexagonal, or octagonal units may be constructed The circular truncated cone geometry is structurally superior and can be made without internal reinforcement, while being best suited for mass production as will be required for the hundreds of miles of coastline now suffering major erosion. Other geometries of installation may be obvious, however the preferred orthogonal grid geometry provides a reasonable and economical spacing and sizing of the interstitial wave-blocks which interconnect the cones.

The scope of the invention therefore relates to the use of truncated cones which disperse the energy of incoming waves and captures the sand contained within the waves. The truncated cones also develop a settlement-resistant foundation reaction on the sand and sedimentary material by the containment effect of the conical shape, and the sand being almost infinite in compression strength when adequately retained in a container. The interconnecting "wave-blocks" provide a leak-resistant connection between adjacent "beachcones".

The present invention provides a method of manufacture of a plurality of lightweight truncated conical sections of precast concrete which are installed in a grid pattern on the first level and interconnected with mating interstices, or "wave-blocks", that conform to the installed geometry. A second level can be installed on a similar grid pattern at a one-half frequency dimension from the lower grid, so that each conical section on the second level is supported on four points, north, south, east, and west by the lower level. Again the upper level is inter-connected by mating interstices which lock into a third level, if desired.

The interstices on the first level are cast with a ledge which mates with the undersides of the next level of truncated cones, so that each cone above is restrained from lateral movement from four interconnecting interstices, or wave-blocks, below. The interstices are shaped to conform to the truncated cones in a double concave section which serves as a labyrinth seal to restrict the passage of sand or soil grains attempting to leave with the retreat of the last wave. Therefore the water must, for the greater part, escape through the bottom of the truncated cone and the sand it carries is retained by the very effective sand filter of the existing beach.

The geometry of the water-facing truncated cones, which are made with a very significant slope away from the incoming waves, forces the wave to the left and right of the center of the cone, as well as upward, at the same time. The intersection of the diverted wave at the intersection of two adjacent truncated cones is further directed upward by the forward sloping interstitial "wave-block", which also absorbs wave energy while diverting the wave splash upward to return directly into the cruciform shape formed by the enclosing geometry of four adjacent "cones" placed into the orthogonal "grid" pattern. The "under-tow" or back-washing of the sand grains away from the beach when the wave "ebbs" is eliminated. All of the power necessary to construct a new beach is provided by wave-action.

A significant build up of new sand seaward of the placement of the "beach-cones" has been observed in actual full-scale tests. At high tides, this is explained by the fact that the ebbing waves are deflected by the tops of the beachcone installation, causing hydrodynamic eddies that further drop sand grains in this area. The next sequence of wave action picks up some of this material and deposits it into and behind the beachcone installation. A complete build up of new beach has been observed to occur within six months, both behind and ahead of the beach-cones, with only a double row of single-height cones installed at low tide.

The conical shape resists any movement of the beachcones when sand is built up on all sides of the cone. The "beach-cones" and interconnecting "wave-blocks" can be easily removed by hand with the use of a strong water jet. The multiple installation of the cones is suitable for the necessary articulation required on an uneven beach bottom.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Referring initially to FIGS. 1–6 of the drawings, two basic elements make up the preferred embodiment of the apparatus of the present invention designated generally by the numeral 10, including a thin truncated cone-like ring 11 having an open top 15 and an open bottom 16, and an interstitial block 12. The cone ring 11 and block 12 units are arranged in a simple preferably orthogonal (FIG. 3) pattern, and may be stacked in a pyramidal fashion as high as necessary. The basic geometry of the preferred embodiment preferably has a slope of the sidewalls 13, 14 of the truncated cone-like ring 11 based on a "3-4-5" triangle, however any slope preferably between thirty to forty-five degrees (30°–45°) can be utilized Truncated cone-like rings function to trap and hold accretions so that not only is existing beach or wetland preserved against erosion, but buildup of solid matter is effected, enlarging the surrounding coastal land mass or "beach". Thus, for purposes of simplicity, the truncated cone-like rings 11 will be referred to hereinafter as beach-cones 11 while interstitial blocks 12 shall be referred to hereinafter as wave blocks 12.

Figure 1:
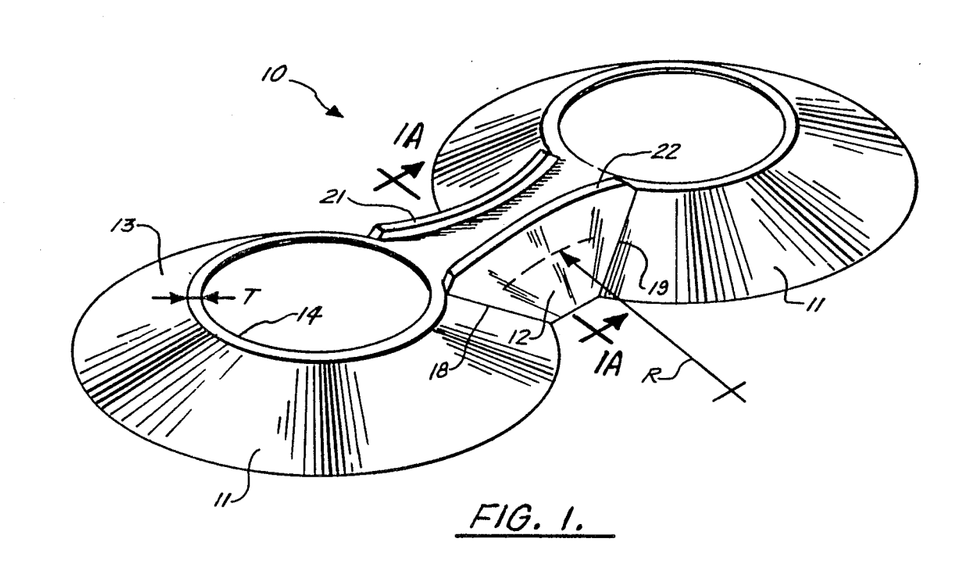
FIG. 1 is a perspective view of the preferred embodiment of the apparatus of the present invention illustrating two "beachcones" with an adjoining "wave-block"
Figure 1A:
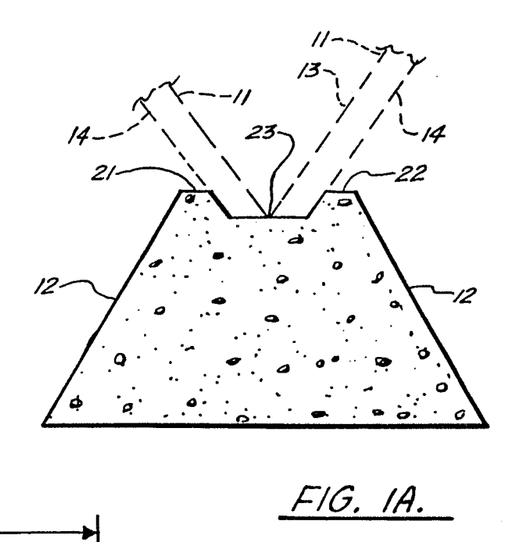
FIG. 1A is a sectional view taken along lines 1A—1A of FIG. 1.

Beachcones 11 may be as small as forty inches (40") in outside diameter or as large as ten feet (10') or more for deep sea installation. It has been found that a preferable size for beachcone 11 as shown in FIG. 1 is 40 inches in outside diameter D1 and twenty-four inches (24") in interior diameter, D2.

Figure 3:
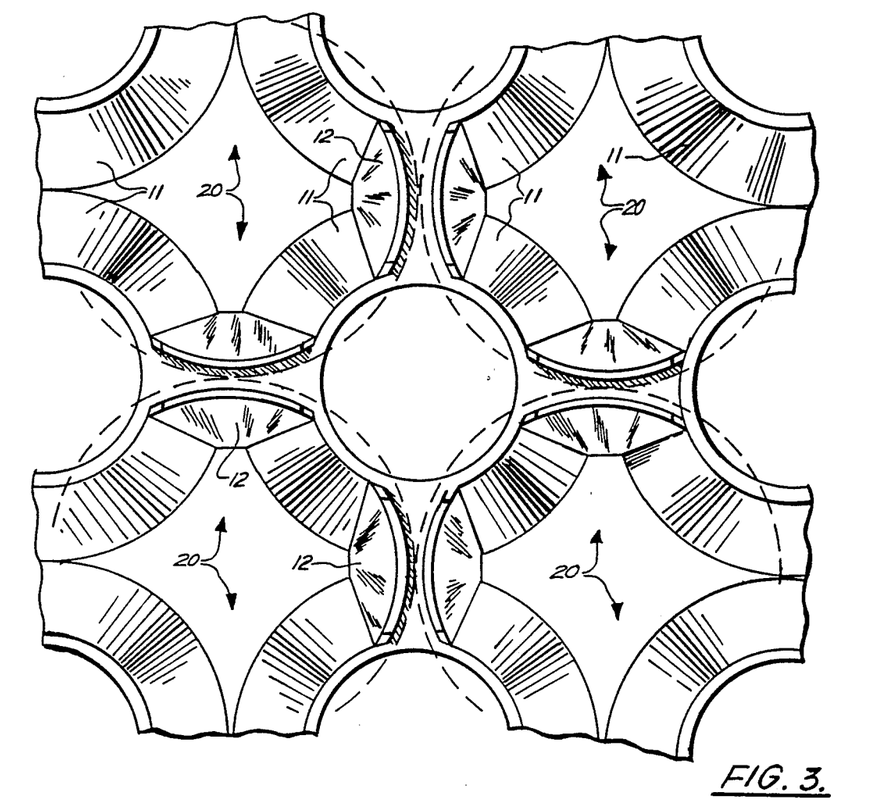
FIG. 3 is a plan, fragmentary view of a plurality of beachcones and wave blocks.

In FIG. 3, the thickness T may be as thin as one inch (1") due to the structural geometry of the beachcone 11. With a vertical height H of six inches (6"), the relationship is six inches vertical height H, eight inches (8") on the horizontal and 10 inches on the slope of sidewalls 13, 14. This is equivalent to the basic 3/4/5 triangular relationship which has proven to work exceedingly well in erosion control and mass buildup in actual tests on an existing eroding beach.

This particular geometry and dimension results in a very lightweight beachcone of only eighty-five (85) pounds weight in air and forty-five (45) pounds weight in water. The beachcones are easily carried by two persons, or can be rolled on the edge by only one person to the water's edge. A preferably material for beachcones 11 is glass-fibre reinforced concrete, and any concretious or formable material may be suitable. The advantage of the normal concrete used is the weight which is necessary to keep the beachcones from floating away when first installed on a beach area with significant wave action. The weight of plastic material, in water, is such that "tie-downs" would be required in order for the beachcone 11 to retain its original footprint location.

Figure 2:
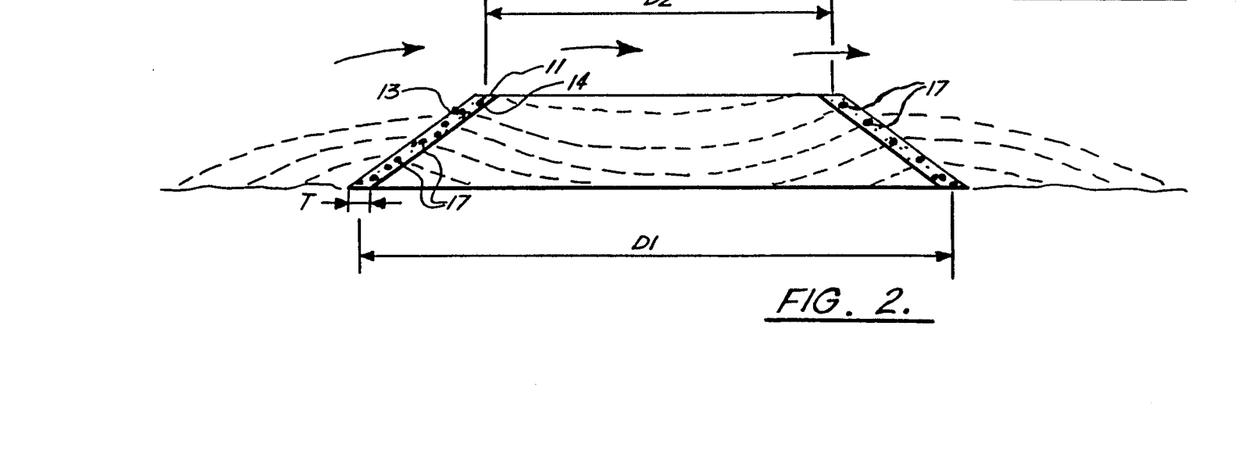
FIG. 2 is a sectional view of the preferred embodiment of the apparatus of the present invention showing a typical "beach-cone" and wave action and sand deposition thereover.

The beachcones 11 can be reinforced with annular steel or galvanized steel rods 17 as shown in FIG. 2. Fiberglass strands may also be used for reinforcement 17. However, beachcones 11 can be constructed with only the cast-in-place chopped fiberglass reinforcing mixed with the wet concrete. The beachcones 11 are easily stackable due to their shape, with outer surface 13 of one beachcone 11 nesting upon the inner wall surface 14 of an underlying beachcone 11 during stacking.

In FIG. 1, an isometric view of the interstitial "waveblock" 12 is shown. Block 12 comprises a unitary body with a double concave periphery unit which very closely registers with a pair of adjoining beachcones 11 so as to form a labyrinth seal therewith that prevents sand or soil seepage between the respective beachcone 11 and the abutting wave-block 12. The pair of concave faces 18, 19 of the wave-block 12 provides concave surfaces matching the respective outer wall 13 curved, conical surface of the adjoining cones.

Figure 4:
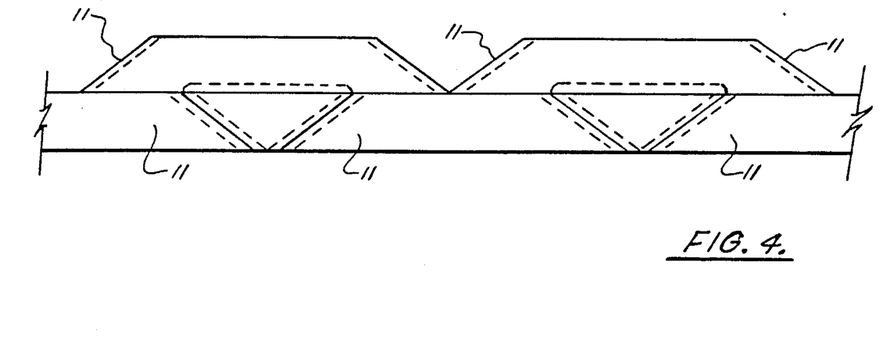
FIG. 4 is an elevational sectional view of a double layer of beach cones.
Figures 5, 6:
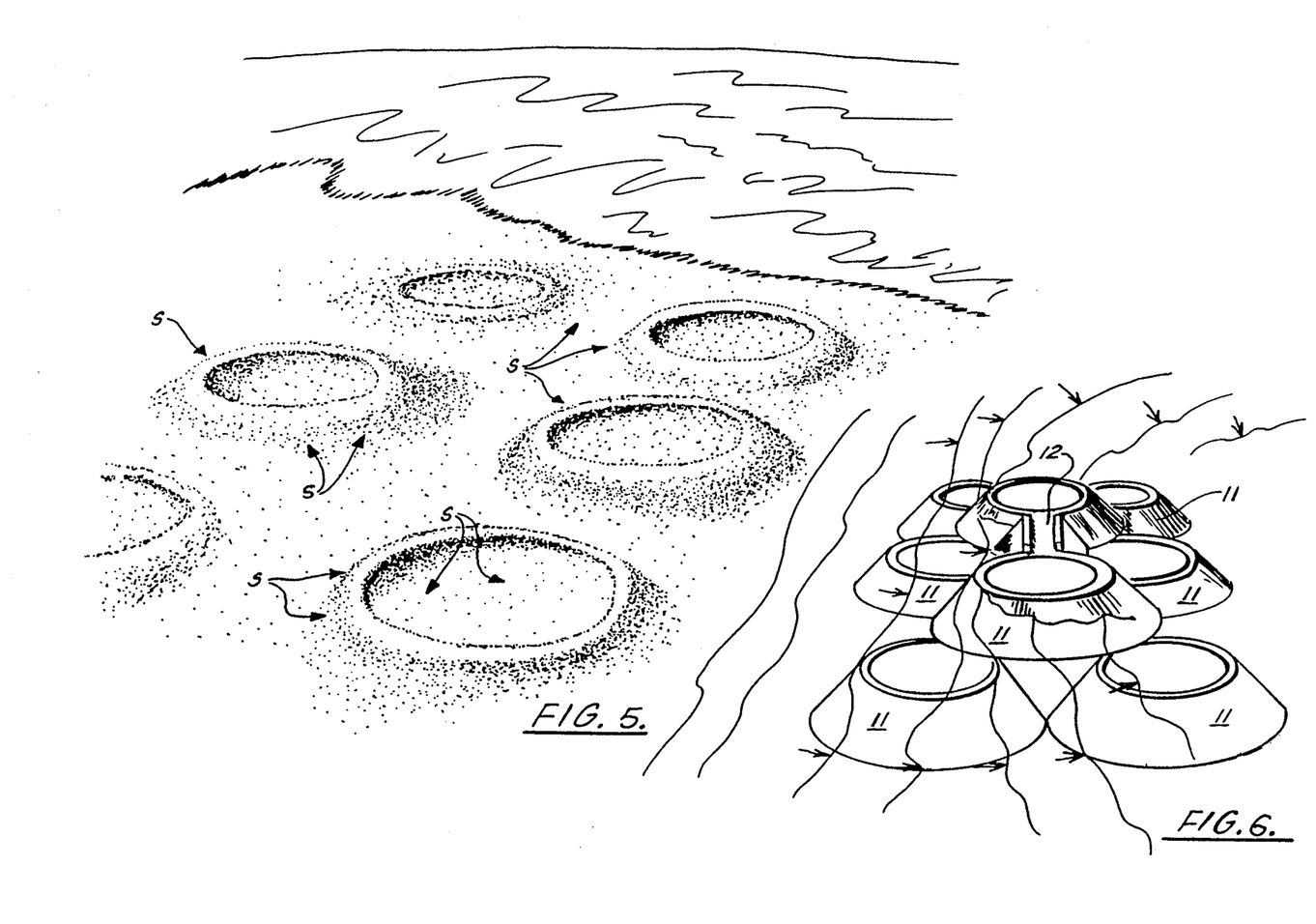
FIG. 5 is a perspective view of the preferred embodiment of the apparatus of the present invention illustrating sediment accumulation therewith.
FIG. 6 is a perspective view of the preferred embodiment of the apparatus of the present invention.

Block 12 is solid enough to absorb and redirect wave flows forced into the blocks 12 by the adjacent beachcones 11, upward the next layer of beachcones 11 which is tangent to the top of the wave block 12. If the wave block 12 is at the top of the construction 10, the wave then splashes downward into the "cruciform" cavity 20 formed by four adjacent beachcones 11, as shown in FIGS. 2 and 4. The water then seeps out of the bottom of the beachcone 11 and block 12 construction while the sand or soil contained in the wave remains inside since it is "filtered-out" by the existing beach material.

This is the manner in which the beachcone 11 and block 12 installation reverses the erosional effects of wave action upon a beach. The beachcones 11 allow the sedimentary material S to come in with the incoming waves, yet without allowing the sand to wash out with the retreating waves (see FIGS. 2 and 5–6).

In FIGS. 1 and 3, perspective and plan-views of the wave-block 12 is shown with circular segmental ridges 21, 22 shown. When layers of beachcones 11 are stacked, ridges 21, 22 contact the interior of the bottom of adjacent beachcones 11 so that each beachcone 11 is supported by the top 23 of each of four wave-blocks 12 and restrained from moving by the segmental ridges 21, 22 of the wave-blocks 12 below. If necessary, holes and plastic bolts or anchors may be added to form a connection through both the wave-blocks 12 and the adjoining beachcones 11 to positively anchor the entire construction together. The radius of the face of the wave-block 12 is such as necessary to match and fair in as a sinusoidal curve with the adjoining beachcone providing the incoming wave a very smooth transition upward so as not to lose the sand grains it is carrying.

If FIG. 4 a typical double row of beachcones 11 is shown, in elevation of double height. An installation 10 of only one double row of single height beachcones 11 and wave-block 12 has proven to build up solid material in, behind, and ahead of this installation 10. The installation 10 will work to some degree without the waveblocks 12, however the addition of the wave-blocks 12 will allow solid material to build up right to the top of the beachcones whilst without wave-blocks 12 the sand material will deposit within two inches of the top of the construction. A second single layer of beachcones 11 may be added to the double row below as shown in FIG. 3 and is indicated by the top-installed beachcones 11.

Figure 7:
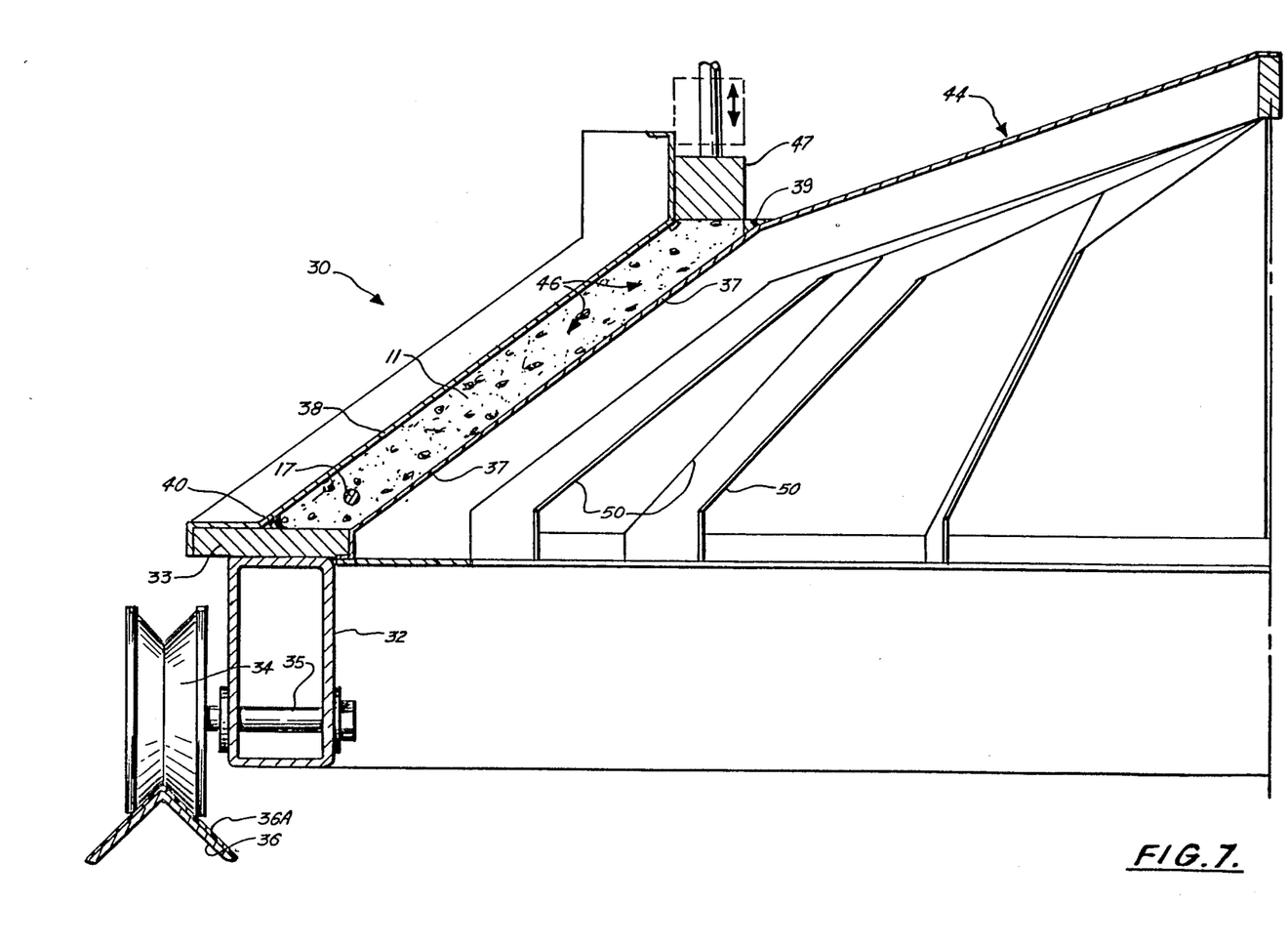
FIG. 7 is a detail sectional drawing of casting machine arrangement.

Beachcones 11 are constructed of a minimum of material, to be specific, less than 6/10th of the cubic foot of concrete is used for the smaller forty inch (40") diameter beachcone 11, which weighs approximately eighty-five (85) pounds in air when cast of concrete with one hundred forty (140) pounds per cubic foot density. Thus, forty-five (45) beachcones 11 sized as above can be cast with one cubic yard of concrete, or, the cost of the concretious material may be equal to or less than one U.S. Dollar, (for example). Wave blocks 12 complementing the above sized beach cones 11 require approximately one half ($\frac{1}{2}$) the material of the beachcones 11. While the wave-blocks 12 can be cast inverted by normal concrete-block casting methods, the thin truncated conical beachcones 11 are difficult to mass produce by normal concrete casing methods It is a purpose of the present invention to describe a process of mass-production of the truncated conical beachcones 11. In FIG. 7, a one-half section of the casting machine 30 is shown. A square tubular steel frame 32 supports the casting "donut" ring 33. Frame 32 is supported by V-groove wheels 34, which are supported by axles 35. The V-groove wheels 34 ride on angle iron rails 36 directly into position to receive the bottom "inside" mold 37 and the top "outside" mold 38.

Circular steel or flexible rubber or plastic "chamferstrips" 39 and 40 are attached to the donut casting ring 33 to serve as seals and eliminate the sharp edges of the cast beachcone. Chamfer-strip 40 provides resistance to the freshly packed material from sliding outward, and serves as a temporary structural "tension" ring to hold up the freshly cast beachcone.

The lower inside mold 37 is raised into position as shown from a much lower station that allows the donut frame 32 to ride "over" said mold. A hydraulic ram for example can be used to effect the elevation of the inside mold 37 to be forced tight against the donut frame 32 and casting donut ring 33 face. At the same time, such as by hydraulic ram, the upper casting mold 38 is lowered into a position against the casting donut 33 face. The positioning of these two hydraulically actuated devices removes any critical vertical loads from the donut frame wheels 34.

Prior to the positioning of the donut frame 32 and circular casting face 33, the "donut" 33 has been cleaned and oiled as in normal concrete casting plant procedures. One or more annular-reinforcing wire hoops 17 have been installed with plastic spacers (not shown) as necessary. The donut frame 32 is rolled into exact position while the lower conical mold 37 is raised and upper conical mold 38 is lowered into precise position on the respective connecting faces and seals 39 and 40 for a water-tight seal by means of hydraulic pressured elevating and lowering hydraulic rams, positively attached to their respective conical mold 37 and 38. At this time, a very dry-mixed composition of sand and portland cement, sand and peagravel, with conventional concrete admixtures, and a very small amount of water is dropped by conveyor belt directly onto the conical directing surface 44 integral with the lower mold 37.

Conveniently placed electric or hydraulic vibrators (not shown) are preferably integrally attached to the molding conical surfaces causing the "dry-mix" concrete to be deposited into the beachcone molding space 46.

During this time, a "sand-tamping" device 47, of circular plan and equal to the precise opening of the top surface thickness "T" of the beachcone, "tamps" the dry-mixed concrete to compress all sand and cement grains together and, at the same time, causing the small amount of water contained herein to "cement" the aggregation together. The combination of the correct frequency of the vibrators along with a fairly rapid tamping of the circular sand tamper 47 will cause the sand and cement to hold together as a unit within a few minutes of vibratory-tamping.

This above method will allow the vertical removal of the sand tamper 47, the upper form 38 and the lowering of the lower mold 37 within two to three minutes of operation. At this time, the newly formed beachcone 11 will be supported entirely by its own minimal tamped strength and the support of the donut face 33 and the chamfer seal 40.

By utilizing a multiplicity of donut forms constructed of parts 32-35, it is possible to produce for example, one hundred twenty (120) or more beachcones per eight (8) hour day with one casting machine 30 as described in this invention.

With several machines operating from a single concrete conveyor belt, the labor costs of producing the beachcones can be reduced to a few dollars per unit. With an inverted conical vacuum pick-up device, precisely similar in shape to the outside form 38, it is possible to separate the newly formed beachcones within 3 to 6 hours of their initial manufacture, thereby reducing the number of casting "donuts" required per casting machine. This device will also be useful in stacking and loading the beachcone 11 for shipment. This device will also be useful in drawing the water out of the newly cast concrete beachcone 11. "Vacuum-curing" of concrete is well known in the pre-cast concrete industry, and increases the strength while decreasing the setting time considerably.

Therefore it will be useful to incorporate the vacuum process in all of the outer conical molds 38. Reinforcements are built into the inner mold 37, in the form of stiffening ribs 50 to resist deformation by the pounding effect of the mechanical sand-tamper 47.

The removal of the upper and lower conical molds 37 and 38 is critical to the time period of the vibratory-tamping process. The sand tamper 47 has at least one inch (1") of vertical movement in order to allow the dry-mix-cereal-like material to enter the formed area 46.

A higher, and smoother frequency of vibration is used during the lowering and raising of molds 37 and 38. Then the newly molded material is very carefully moved by means of the V-groove wheels 34 riding smoothly on rubber 36A coated angle iron rails 36, to a staging area wherein normal, or accelerated steam, water, or vacuum curing can be accomplished.

The empty molds 37 and 38 are then very quickly washed by water spray and oiled by oil spray, in their respective lowered and raised positions, immediately before receiving the next new "empty" donut 32. The cycle is complete and can be accomplished for example within 3 to 4 minutes.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wave actuated erosion control, accretion collection system comprising:
   (a) a matrix of generally circular rings-like elements each having an inclined continuous thin sidewall with an outer surface and an inner surface defining a hollow interior with an internal horizontal cross-section that decreases between the bottom and top of the ring-like element for trapping sedimentary material, the ring-like element having upper and lower respective continuous edges defining respectively an upper smaller opening and lower larger base portion with a downwardly facing opening, and the sidewall outer surface having a slope between the lower edge and the upper edge of between about thirty and forty-five degrees (30°-45°); and
   (b) connection means between adjacent ring for maintaining the ring-like elements in a matrix.

2. The apparatus of claim 1 wherein the upper and lower respective edges circumvent respective upper smaller and lower larger open portions that communicate with the hollow interior.

3. The apparatus of claim 2 wherein the thin sidewall outer surface is a truncated cone shape.

4. The apparatus of claim 1 wherein combination of the top of each wave block and the connection means provides means for supporting second a ring-like element stacked thereupon.

5. The apparatus of claim 1 wherein the connection means is a block that simultaneously bears against a pair of adjacent rings during use.

6. The apparatus of claim 5 wherein the blocks and ring-like elements having substantially equal heights.

7. The apparatus of claim 1 wherein the ring-like elements are frustro conical in shape both internally along the outer sidewall and internally along the interior wall.

8. The apparatus of claim 1 wherein each ring has a uniform wall thickness.

9. The apparatus of claim 1 wherein the ring-like elements are of a concretious material.

10. The apparatus of claim 9 wherein the ring-like elements are of reinforced concrete.

11. The apparatus of claim 1 wherein the ring-like elements have a sidewall internal wall inclination of between thirty and forty-five degrees (30°-45°).

12. The apparatus of claim 1 wherein the ratio of maximum diameter to wall thickness of each ring-like element is between twenty to one (20 to 1) and forty to one (40 to 1).

13. The apparatus of claim 5 wherein the blocks have multiple concave surfaces that respectively bear against the side walls of adjacent ring-like elements during use.

14. The apparatus of claim 13 wherein the ring-like elements and the blocks are of a concretious material.

15. A wave actuated erosion control, accretion collection system comprising:
   (a) a matrix of generally circular ring-like elements, each having an inclined continuous thin sidewall with an outer surface, and an inner surface defining a hollow interior with an internal horizontal cross-section that decreases between the bottom and top of each ring-like element for trapping sedimentary material;
   (b) each ring-like element having upper and lower respective continuous edges defining respectively an upper smaller opening and lower larger base portion with a downwardly facing larger opening;
   (c) the sidewall outer surface having a slope between the lower edge and the upper edge that defines an acute angle with horizontal so that the outer surface presents a significant incline to incoming waves while discouraging scour at the base portion; and
   (d) wherein the ring-like elements are generally frustro conical in shape.

16. A wave actuated erosion control, accretion collection system comprising:

(a) a matrix of generally circular ring-like elements, each having an inclined continuous thin sidewall with an outer surface, and an inner surface defining a hollow interior with an internal horizontal cross-section that decreases between the bottom and top of each ring-like element for trapping sedimentary material;

(b) each ring-like element having upper and lower respective continuous edges defining respectively an upper smaller opening and lower larger base portion with a downwardly facing opening;

(c) the sidewall outer surface having a slope between the lower edge and the upper edge that defines an acute angle sufficient to prevent scour at the base portion while defining a hollow interior that is shaped to confine and compress sedimentary material; and (d) wherein the ratio of maximum diameter to wall thickness is between about 40 to 1 and 20 to 1.

* * * * *